(12) United States Patent
Hammond

(10) Patent No.: US 10,270,816 B1
(45) Date of Patent: *Apr. 23, 2019

(54) METHOD AND SYSTEM FOR ENABLING A COMMUNICATION DEVICE TO REMOTELY EXECUTE AN APPLICATION

(71) Applicant: Hammond Development International, Inc., Dallas, TX (US)

(72) Inventor: Daniel D. Hammond, Dallas, TX (US)

(73) Assignee: Hammond Development International, Inc., Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/193,532

(22) Filed: Nov. 16, 2018

Related U.S. Application Data

(63) Continuation of application No. 15/613,756, filed on Jun. 5, 2017, which is a continuation of application
(Continued)

(51) Int. Cl.
*G06F 15/16* (2006.01)
*G06F 9/00* (2006.01)
(Continued)

(52) U.S. Cl.
CPC ...... *H04L 65/1069* (2013.01); *G06F 17/3056* (2013.01); *G06F 17/30312* (2013.01);
(Continued)

(58) Field of Classification Search
CPC ............ H04L 63/0272; H04L 63/0281; H04M 2203/105
(Continued)

(56) References Cited

U.S. PATENT DOCUMENTS 5,253,341 A 10/1993 Rozmanith et al.
5,835,724 A 11/1998 Smith
(Continued)

FOREIGN PATENT DOCUMENTS

EP 1885096 A1 6/2008
JP 2007274105 A 10/2007
(Continued)

OTHER PUBLICATIONS

Laing, John, "Client/Server Setup and Implementation: Web and non-Web Environments," Advanced Tutorials, Paper 19-25, SAS Institute (Canada) Inc., Toronto, ON, (date unknown), 10 pages, retrieved from http://www2.sas.com/proceedings/sugi25/25/aa/25p019.pdf on Jan. 19, 2016.
(Continued)

*Primary Examiner* — Joshua L Schwartz
(74) *Attorney, Agent, or Firm* — Fogarty LLP

(57) ABSTRACT

A communication system capable of enabling one or more communication devices to remotely execute one or more applications includes one or more communication devices that are coupled to a data connection. At least one of the one or more communication devices is operable to communicate a request to establish a communication session over the data connection. The system also includes one or more application servers that are coupled to the data connection. At least one of the one or more application servers is adapted to execute an application to establish the requested communication session with the at least one communication device. The at least one application server resides at a location remote from the at least one communication device. The at least one application server communicates a request for processing service to the at least one communication device. The request for processing service is communicated to the at least one communication device over the data connection.

30 Claims, 3 Drawing Sheets

Related U.S. Application Data

No. 15/236,644, filed on Aug. 15, 2016, now Pat. No. 9,705,937, which is a continuation of application No. 14/975,747, filed on Dec. 19, 2015, now Pat. No. 9,420,011, which is a continuation of application No. 11/779,722, filed on Jul. 18, 2007, now Pat. No. 9,264,483.

(51) Int. Cl.

| | | |
|---|---|---|
| *H04L 29/06* | (2006.01) | |
| *H04W 4/60* | (2018.01) | |
| *H04M 11/00* | (2006.01) | |
| *H04L 29/08* | (2006.01) | |
| *G06F 17/30* | (2006.01) | |

(52) U.S. Cl.
CPC .. *G06F 17/30424* (2013.01); *G06F 17/30864* (2013.01); *H04L 67/02* (2013.01); *H04L 67/10* (2013.01); *H04L 67/1097* (2013.01); *H04L 67/141* (2013.01); *H04L 67/18* (2013.01); *H04L 67/42* (2013.01); *H04M 11/007* (2013.01); *H04W 4/60* (2018.02); *H04M 2203/1016* (2013.01)

(58) Field of Classification Search
USPC .......................................... 709/219; 726/15
See application file for complete search history.

(56) References Cited

U.S. PATENT DOCUMENTS

| | | |
|---|---|---|
| 6,195,357 B1 | 2/2001 | Polcyn |
| 6,327,363 B1 | 12/2001 | Henderson et al. |
| 6,362,836 B1 | 3/2002 | Shaw et al. |
| 6,418,199 B1 | 7/2002 | Perrone |
| 6,430,174 B1 | 8/2002 | Jennings et al. |
| 6,512,818 B1 | 1/2003 | Donovan et al. |
| 6,556,997 B1 | 4/2003 | Levy |
| 6,721,705 B2 | 4/2004 | Kurganov et al. |
| 6,753,884 B1 | 6/2004 | Finch, II et al. |
| 6,854,009 B1 | 2/2005 | Hughes |
| 7,068,643 B1 | 6/2006 | Hammond |
| 7,469,293 B1 | 12/2008 | Yoakum et al. |
| 7,881,285 B1 | 2/2011 | Hammond |
| 7,889,852 B2 | 2/2011 | Whitehead |
| 7,912,966 B2 | 3/2011 | Witkowski et al. |
| 8,060,624 B1 | 11/2011 | McKinney et al. |
| 8,272,045 B2 | 9/2012 | Azeez et al. |
| 8,402,115 B2 | 3/2013 | Franco et al. |
| 8,442,221 B2 | 5/2013 | Yoakum et al. |
| 8,532,000 B2 | 9/2013 | Bolliero et al. |
| 8,719,375 B2 | 5/2014 | Hildreth et al. |
| 9,015,297 B2 | 4/2015 | Putman et al. |
| 9,038,162 B2 | 5/2015 | Hagiu et al. |
| 2001/0047406 A1 | 11/2001 | Araujo |
| 2002/0016814 A1 | 2/2002 | Convent et al. |
| 2002/0046286 A1 | 4/2002 | Caldwell et al. |
| 2002/0120719 A1 | 8/2002 | Lee et al. |
| 2002/0130900 A1 | 9/2002 | Davis |
| 2003/0060896 A9 | 3/2003 | Hulai et al. |
| 2003/0074393 A1 | 4/2003 | Peart |
| 2003/0149728 A1 | 8/2003 | Wewalaarachchi |
| 2003/0204562 A1 | 10/2003 | Hwang |
| 2005/0070262 A1 | 3/2005 | Weigand |
| 2006/0037071 A1 | 2/2006 | Rao et al. |
| 2006/0182103 A1 | 8/2006 | Martini et al. |
| 2007/0118534 A1 | 5/2007 | Hayes |
| 2007/0168352 A1 | 7/2007 | Satyanarayana |
| 2007/0220009 A1 | 9/2007 | Morris et al. |
| 2014/0364110 A1 | 12/2014 | Rao et al. |

FOREIGN PATENT DOCUMENTS

| | | |
|---|---|---|
| WO | 0157691 A1 | 8/2001 |
| WO | 0206963 A1 | 1/2002 |
| WO | WO 2005/022882 A1 | 3/2005 |

OTHER PUBLICATIONS

Peterson, Jon, "Securing Real-Time Communications", ITU-T IETF Workshop, May 2005, 13 Pages, Geneva.

Oracle, "Oracle Application Server TopLink Application Developers Guide," (date unknown), 15 pages, retrieved from: http://docs.oracle.com/cd/B14099_19/web.1012/b15901/sessions008.htm on Jan. 19, 2016.

Nieh, Jason, et al., "A Comparison of Thin-Client Computing Architectures," Technical Report CUCS-022-00, Nov. 2000, Network Computing Laboratory, Columbia University.

Schmidt, Brian K., et al., "The nteractive performance of SLIM: a stateless, thin-client architecture," SOSP '99 Proceedings of the seventeenth ACM symposium on Operating systems principles, pp. 32-47, Charleston, South Carolina, USA, Dec. 12-15, 1999.

METHOD AND SYSTEM FOR ENABLING A COMMUNICATION DEVICE TO REMOTELY EXECUTE AN APPLICATION

CROSS-REFERENCE TO RELATED APPLICATIONS

This application is a continuation of U.S. application Ser. No. 15/613,756, filed Jun. 5, 2017, which is a continuation of U.S. application Ser. No. 15/236,644, filed on Aug. 15, 2016, now U.S. Pat. No. 9,705,937, which is a continuation of U.S. application Ser. No. 14/975,747, filed on Dec. 19, 2015, now U.S. Pat. No. 9,420,011, which is a continuation of U.S. application Ser. No. 11/779,722, filed on Jul. 18, 2007, now U.S. Pat. No. 9,264,483, the disclosures of which are hereby incorporated by reference herein in their entirety.

TECHNICAL FIELD

This disclosure relates in general to the field of communication systems, and more particularly to a method and system that enables a communication device to remotely execute an application.

BACKGROUND

Communication systems often operate to collect information from and/or provide information to one or more users of the communication system. The communication systems typically employ one or more programs that guide the collection of information from and/or the presentation of information to a user. Conventional communication systems may, in some cases, require interaction with a remote input/output device to collect information from the user during the information collection process. For example, the input/output device may provide a communication path between the user of the device and a voice processing system (VPS). The VPS may include programs that respond to audio input, such as dual-tone multi-frequency (DTMF) or voice, and produce audio output back through the network to the user.

SUMMARY OF EXAMPLE EMBODIMENTS

In one embodiment, a communication system capable of enabling one or more communication devices to remotely execute one or more applications comprises one or more communication devices that are coupled to a first communication link that comprises a data connection. At least one of the one or more communication devices is adapted to communicate a request to establish a communication session over the first communication link. In one particular embodiment, the at least one communication device is a thin-client device that provides processing services to an application substantially executed at a location remote from the at least one communication device. The system also comprises one or more application servers that are coupled to the first communication link and are operable to receive the request communicated over the first communication link. The system further comprises one or more repositories that are coupled to at least one of the one or more application servers and are operable to communicate with the one or more application servers. At least one of the one or more repositories having access to one or more applications maintained in a database coupled to the at least one repository. The at least one repository adapted to communicate the identified application over a second communication link to the at least one application server. The at least one application server adapted to execute the identified application remote from the at least one communication device and to establish the communication session with the at least one communication device. In this particular embodiment, the at least one application server communicates a request for processing service to the at least one communication device. The request for processing service is communicated to the at least one communication device over the data connection.

In another embodiment, a communication system capable of enabling one or more communication devices to remotely execute one or more applications comprises one or more communication devices that are coupled to a data connection. At least one of the one or more communication devices is operable to communicate a request to establish a communication session over the data connection. The system also includes one or more application servers that are coupled to the data connection. At least one of the one or more application servers adapted to execute an application to establish the requested communication session with the at least one communication device. In this particular embodiment, the at least one application server resides at a location remote from the at least one communication device. The at least one application server communicates a request for processing service to the at least one communication device. The request for processing service is communicated to the at least one communication device over the data connection.

In one example of a method for enabling one or more communication devices to remotely execute one or more applications, the method comprises communicating a request to establish a communication session from at least one communication device over a data connection. The method also comprises executing an application to establish the requested communication session over the data connection. The application executed remotely from the at least one communication device. The method further comprises communicating a request for processing service to the at least one communication device. In this particular embodiment, the request for processing service is communicated to the at least one communication device over the data connection.

Depending on the specific features implemented, particular embodiments of the present invention may exhibit some, none, or all of the following technical advantages. For example, various embodiments may be capable of executing an application for a thin-client device. Some embodiments may be capable of improving the efficiency of a user's interaction with a communication system. Certain embodiments of the present disclosure provide improvements for voice processing applications, including cost, performance, and availability.

Other technical advantages will be readily apparent to one skilled in the art from the following figures, description and claims. Moreover, while specific advantages have been enumerated, various embodiments may include all, some or none of the enumerated advantages.

BRIEF DESCRIPTION OF THE DRAWINGS

For a more complete understanding of the present invention, and for further features and advantages thereof, reference is now made to the following description taken in conjunction with the accompanying drawings, in which.

DETAILED DESCRIPTION

Figure 1A:
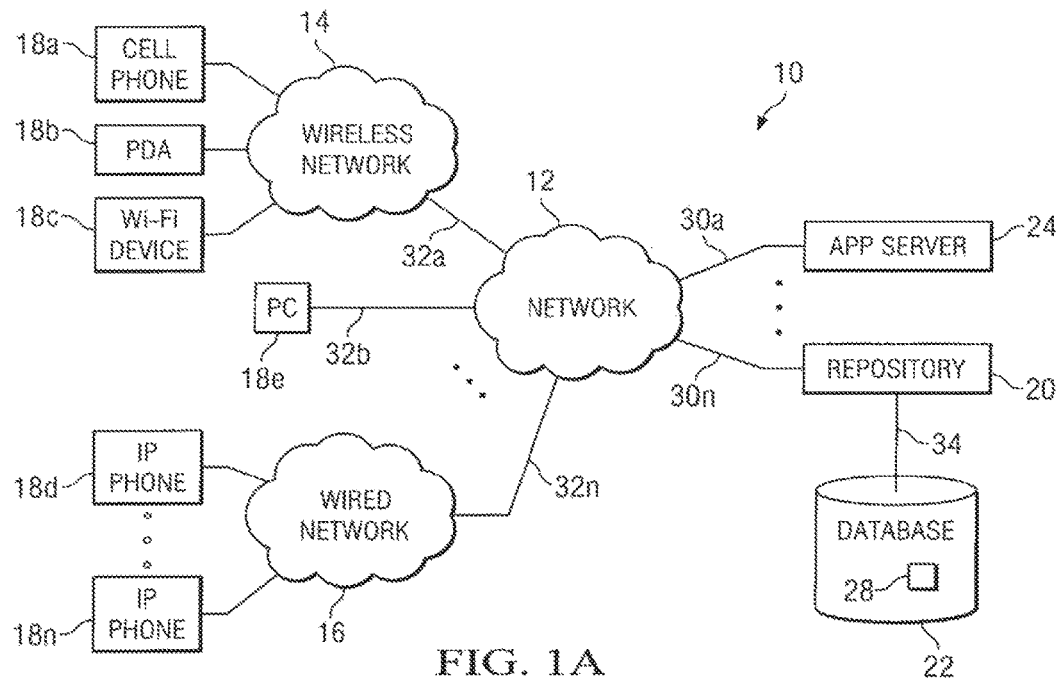
FIGS. 1A-1D illustrate example embodiments of a communication system capable of collecting information from one or more users of the system.

Particular examples and dimensions specified throughout this document are intended for exemplary purposes only, and are not intended to limit the scope of the present disclosure. In particular, this document is not intended to be limited to remote processing of voice-based applications, such as, Voice XML-based applications.

FIGS. 1A-1D are block diagrams of example embodiments of a communications system 10 capable of collecting information from one or more users of system 10. In various embodiments system 10 can comprise a network or communication system used by an entity, such as, for example, a hospital, a bank, or other business entity. It should be appreciated that other embodiments of system 10 may be used without departing from the scope of the present disclosure.

In these examples, system 10 includes one or more application servers 24 capable of performing a desired communicating and/or computing functionality, such as, for example, accessing, retrieving, and/or executing one or more system applications 28, or portions thereof. As non-limiting examples, application servers 24 could comprise some or all of a Voice XML-based system, an extensible interactive voice response (XIVR) system, an interactive web-based system, or a combination of these or other information systems. In particular embodiments, application servers 24 may include one or more software and/or firmware modules. In various embodiments, application servers 24 could comprise, for example, one or more software engines, one or more memory modules, and/or one or more speech recognition modules capable of processing Voice XML-based applications, XIVR-based applications, voice responses, text-to-speech translations, and/or speech-to-text translations.

In one particular embodiment, application servers 24 receive and/or communicate information, portions of an application, and/or one or more requests for processing service through a network 12 coupled to application server 24. As used throughout this document, the term "couple" and/or "coupled" refers to any direct or indirect communication between two or more elements, whether or not those elements are in physical contact with one another. In this example, application servers 24 couple to network 12 through one or more communications links 30. In other embodiments, application servers 24 operate to collect, store, and/or communicate information to and/or from network 12.

Network 12 may comprise any wireless network, wireline network, or combination of wireless and wireline networks capable of supporting communication between network elements using ground-based and/or space-based components. In this particular embodiment, network 12 comprises at least a portion of the global computer network known as the Internet. In other embodiments, network 12 may comprise a information network, a public switched telephone network (PSTN), an integrated services digital network (ISDN), a local area network (LAN), a wide area network (WAN), a metropolitan area network (MAN), and/or other communication systems or combination of communication systems at one or more locations.

One or more clients 18a-18n may couple to network 12 through one or more communications links 32 and/or one or more networks 14, 16. Each client 18 may include any computing and/or communication device capable of enabling the communication of information to and/or from network 12. In some embodiments, clients 18a-18n may enable a user of system 10 to communicate information to and/or receive information from one or more of application servers 24. In other embodiments, clients 18a-18n can enable a user of system 10 to communicate information to and/or receive information from one or more repositories 20.

In various embodiments, clients 18 may comprise a thin-client. As used throughout this document the phrase "thin-client" refers to a device that provides processing services to an application executed at a location remote from the device. Each client 18 may include, for example, a wireless device, a voice over IP device, a desktop computer, a laptop computer, a personal digital assistant, a cell-phone, a Wi-Fi device, a workstation, a mainframe computer, a mini-frame computer, a web server, or any other computing and/or communicating device. Although these examples show clients 18 communicating with application servers 24 and/or repositories 20 over network 12, in other embodiments, some or all clients 18 could alternatively, or in addition, communicate with application server 24 and/or repositories 20 using direct links.

System 10 also includes one or more repositories 20 coupled to network 12 and capable of performing a desired communicating and/or computing functionality. In this particular embodiment, one or more repositories 20 include application logic adapted to identify a desired application 28. In various embodiments, repositories 20 may operate to identify a desired application 28 and to communicate application 28, or portions thereof, to one or more of application servers 24 for execution. In some cases, one or more repositories 20 may be capable of storing and/or having access to one or more applications 28.

In this particular embodiment, repository 20 accesses applications 28 stored in a database 22. As used throughout this document, the term "application" refers to functionality that is capable of facilitating the ability to collect information from and/or present information to one or more clients 18 or users of system 10. In one particular non-limiting example, application 28 comprises a series of queries requesting information from and/or presenting information to a user of client 18. In some cases, applications 28 may include, for example, a Voice XML-based application, an HTML-based application, an XML-based application, an XIVR-based application, or a combination of these or other application formats. Applications 28 may comprise, for example, software, firmware, code, portions of code, a program, a web-page, information compilations, and/or a combination of these or any other types of utilities. In other embodiments, database 22 may be capable of storing, for example, one or more functions and/or other information.

Database 22 may include any hardware, software, firmware, or combination thereof operable to store and facilitate retrieval of one or more applications 28 and/or information. Database 22 may store information and applications 28 using any of a variety of information structures, arrangements, and/or compilations. In some embodiments, database 22 can also store a record of any interaction between a user of client 18 and system 10. Database 22 may, for example, include a dynamic random access memory (DRAM), a static random access memory (SRAM), a NAND flash memory, or any other suitable volatile or nonvolatile storage and retrieval device or combination of devices. Although this example depicts database 22 as a single medium, database 22 may comprise any additional number of storage media without departing from the scope of the present disclosure. Additionally, all or part of database 22 could reside locally within repository 20 or could reside in a location remote from and accessible to repository 20. Although these examples shows repository 20 communicating with application servers 24 and/or clients 18 over network 12, in other embodiments, repository 20 could alternatively, or in addition, communicate with application server 24 and/or clients 18 using direct links.

In the illustrated embodiment, system 10 includes at least first communications links 30 and second communications links 32 operable to facilitate the communication of information to and/or from network 12. System 10 also includes a third communications link 34 operable to facilitate the communication of information between repositories 20 and database 22. Communications links 30, 32, and 34 may include any hardware, software, firmware, or combination thereof. In various embodiments, communications links 30, 32, and 34 may comprise communications media capable of assisting in the communication of analog and/or digital signals. Communications links 30, 32, and 34 may, for example, comprise a fiber optic line, a Digital Subscriber Line (DSL), a wireless link, a USB bus, a PCI bus, an ethernet interface, or any other suitable interface and/or medium operable to assist in the communication of information to and/or from network 12. In this particular embodiment, communication links 30, 32, and 34 comprise data connections. In this example, any data communicated between application servers 24 and clients 18 over communication links 30 and 32 is advantageously communicated asynchronously. Communicating the data asynchronously allows more than one user to connect to application servers 24 at the same time over a single data connection.

In this particular embodiment, communication link 32a is coupled to a wireless network 14 and communication link 32n is coupled to a wireline network 16. Although communication links 32a and 32n are coupled to wireless network 14 and wireline network 16, respectively, in this example, other embodiments may exclude wireless network 14 and/or wireline network 16 without departing from the scope of the present disclosure.

In some embodiments, clients 18 can be configured to initiate a connection with repositories 20 and/or application servers 24. In some cases, clients 18 can initiate a data connection with repositories 20 and/or application servers 24. For example, if client 18 is a mobile phone, a wireless connection can be processed through wireless network 14 to application server 24. After the client 18 connects to application server 24, application server 24 can initiate a preliminary communication session with the user of client 18. Through this initial communication session, information regarding the target address of client 18 can be established. Address information can be gathered automatically, for example by reading a unique identification number of the device, or by question and answer sequences with the user of device 18. Repository 20, database 22, and/or application server 24 can also store caller associated data, such as an IP address used to establish a data connection. In some cases, repository 20 and/or application server 24 can establish a data socket connection to communicate with client 18, or the repository 20 can notify the application server 24 to establish this connection with client 18. This connection can then be used for the duration of the communication session.

Landline phones and/or IP phones can also communicate with repository 20 and/or application server 24 in the same manner as mobile phones described above. Also, repository 20 and/or application server 24 may also use simultaneous or duplexed data connections with clients 18. This can allow repository 20 and/or application server 24 to simultaneously execute the initial communication session while also communicating over another data connection with client 18.

FIG. 1A is a block diagram of one example embodiment of communication system 10 that enables a client 18 to have one or more applications 28 executed remotely. In this particular embodiment, a user of client 18a initiates an information collection and/or retrieval process by communicating a request to application server 24. Although a user of client 18a initiates a communication session in this example with application server 24, any of clients 18a-18n could initiate the communication session with application server 24 and/or repository 20 without departing from the scope of the present disclosure. In other embodiments, a user of client 18a could initiate the information collection and/or retrieval process by connecting to repository 20. In some embodiments, one of applications server 24 and/or repository 20 could initiate the information collection process with client 18.

In this particular embodiment, client 18a comprises a thin-client. In this example, client 18a preferably has memory and some processing capabilities that enable client 18a to execute portions of code to assist with the interaction with remotely executed application 28. A remotely executed application is one in which a substantial portion of the code executes on a device other than client 18. In this example, application server 24 is addressed using an Internet Protocol (IP) layer address. In other embodiments, application server 24 could be addressed using any other addressing format, such as, for example, uniform resource locator (URL).

In this example, application server 24 notifies repository 20 that a communication session with client 18 has been requested. Repository 20 using its application logic operates to identify a desired application 28 and to communicate application 28, or portions thereof, to application server 24 for execution. Upon receipt of application 28, application server 24 executes application 28 and begins a communication session with client 18a. In this example, application server 24 begins the process of communicating information to and/or retrieving information from client 18a. In this particular embodiment, application server 24 executes a Voice XML-based application that enables application server 24 to interact with and collect information from client 18a. In other embodiments, the application executed by application server 24 may comprise, for example, an XIVR-based application, an HTML-based application, a VML-based application, or a combination of these or other application formats.

In this particular embodiment, application server 24 executes the Voice XML-based application 28 remote from client 18a. In this example, client 18a provides application independent processing services to Voice XML-based application 28 executing remotely. In some cases, application server 24 can communicate some programs to client 18a for downloading to assist application server 24 in interacting with client 18a. In most cases, any program downloaded to client 18a would assist with the collection of information from and/or the presentation of information to the user of client 18*a*. For example, application server 24 may communicate a voice recognition software program to client 18*a* for downloading, which will assist client 18*a* in executing one or more queries associated with the Voice XML-based application 28 being executed on application server 24.

Application server 24 interacts with the user of client 18*a* by requesting that the user of client 18*a* respond to a series of queries associated with application 28. To that end, application server 24 communicates information relating to portions of Voice XML-based code to client 18*a* for execution on client 18*a*, which enables the user of client 18*a* to interact with application server 24. In some embodiments, the user of client 18*a* can respond through a DTMF input, a voice input, a stylus input, a keyboard input, and/or any other device capable of receiving a response that is comprehensible to client 18*a*. In this particular embodiment, the user of client 18*a* responds to each of the series of queries by "speaking" a response to each query communicated to client 18*a* for execution. In this example, client 18*a* communicates the user's spoken response as a data communication. That is, the user's response is packetized and communicated in a packet based communication. By transmitting only data, problems associated with voice quality degradation are advantageously reduced.

In this particular embodiment, application server 24 receives and decodes the user's responses to each of the queries associated with the Voice XML-based application. Although application server 24 receives the responses to the queries in this example, repository 20 and/or database 22 could alternatively receive the responses without departing from the scope of the present disclosure. Upon receipt, application server 24 executes the next portion of Voice XML-based application 28 based at least in part on the user's response. Application server 24 will continue to interact with client 18*a* until the communication session is terminated. In this example, the user of client 18*a* interacts with application server 24 until the remaining information has been collected and/or presented to the user of client 18*a*. In other embodiments, application server 24 can associate the user of client 18*a* with another one of application servers 24 to collect another portion of information from and/or present another portion of information to the user of client 18*a* using, for example, another application 28.

In some embodiments, after the communication session between client 18*a* and application server 24 is terminated, any programs downloaded to client 18*a* could be deleted to free up the memory. In other embodiments, any programs downloaded to client 18*a* could be retained for use with a future request. Although the program is downloaded to client 18*a* in this example, in alternative examples the program may be pre-installed in client 18*a* without departing from the scope of the present disclosure. For example, a user may anticipate using client 18*a* for buying and selling stocks in real-time and may pre-install a program or interface for performing the necessary communication and/or computing functionality.

In yet another embodiment, client 18*a* could use an Internet browser to host one or more plug-ins that facilitates the processing of commands from the user or the device. In one embodiment, application servers 24 could host the application logic in an enhanced HTML format. A browser utilized by client 18 could read the logic and execute it. The internet browser could be used as an interface to input user information to application 28, and/or present information from application 28 executed on application server 24.

In yet another embodiment, application server 24 and/or repository 20 could package multiple queries or request together and send them to client 18*a* in an executable for interaction with the user. In that embodiment, client 18*a* executes multiple queries or requests for information before communication the users responses to application server 24. When the multiple questions or requests are complete, the responses are sent to the application server 24 for processing, which could result in information being sent back to the user or further requests from the application server 24. The process can be repeated as necessary. In this example, the entire application 28 is not communicated sent to client 18, thus reducing the memory and processing power needed within the device.

Figure 1B:
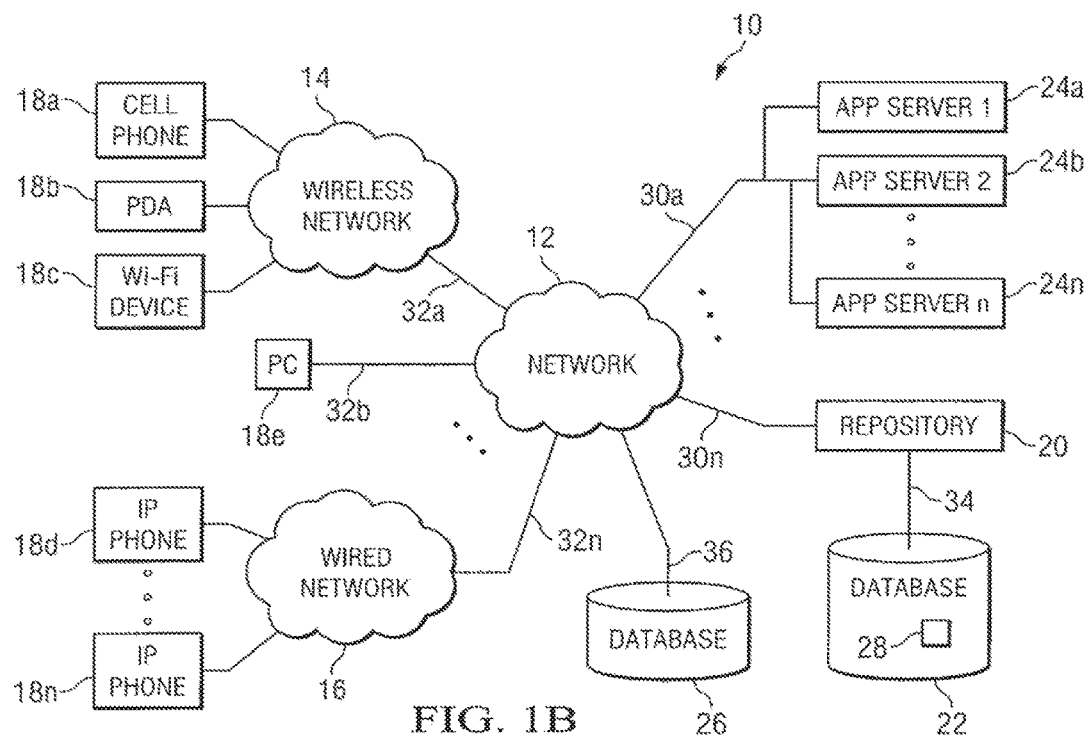

FIG. 1B is a block diagram of one example embodiment of communication system 10 that enables a client 18 to have one or more applications 28 executed remotely. FIG. 1B is similar to FIG. 1A; however, in this particular embodiment, system 10 includes a plurality of application servers 24*a*-24*n* coupled to network 12. Coupling multiple application servers 24 to system 10 advantageously allows system 10 to handle a larger number of simultaneous requests from users of clients 18*a*-18*n*.

In an alternative embodiment, system 10 could include a load balancer (not illustrated) that is coupled to network 12 and application servers 24*a*-24*n*. In that example, the load balancer can comprise logic that enables it to decide which application server 24*a*-24*n* can support a particular request or application 28. In some cases, the load balancer can perform a round-robin assignment. In other cases, the load balancer can choose a particular application server 24 based on dynamic information. For example, the load balancer could choose application server 24*b* since it just handled a similar request and already has the desired application downloaded.

In this example, system 10 also includes a database 26 coupled to network 12 by data connection 36. In various embodiments, the structure and function of database 26 can be substantially similar to the structure and function of database 22. Database 26 can contain a variety of information accessible through network 12. In some cases, database 26 can include user-specific information that can be retrieved by clients 18 or by application server 24, such as account information, credit information, medical information, insurance information, and/or any user-related information. In other cases, database 26 may include nonuser specific information that can be retrieved by clients 18 or application server 24, such as airline flight information, order status information, movie information, and In another alternative embodiment, system 10 could comprise a plurality of repositories 20 connected to a single database 22, or connected to multiple databases 22. In that embodiment, each of the plurality of repositories 20 could be coupled to a load balancer capable of balancing traffic between the plurality of repositories 20. The repositories could be assigned to perform different tasks, or they could perform tasks based on the order they are requested or based on any other allocation system.

In this example, a user of client 18*b* desires to check the balance of his bank account. Although the user of client 18*b* desires to check the balance in his bank account in this example, the user could use system 10 to retrieve and/or communicate any information without departing from the scope of the present disclosure. In this particular embodiment, client 18*b* is a thin-client device. Although client 18*b* is used in this example, any other of clients 18*a*-18*n* could be used without departing from the scope of the present disclosure.

Using client 18*b* the user initiates a communication session with application server 24*a* by communicating a request through network 12. In this embodiment, client 18*b* communicates with application server 24*a* over a data connection. Application server 24*a* notifies repository 20 of the request and repository 20 communicates with database 22 to retrieve application 28 that will assist the user of client 18*b* in performing the desired functionality. In some cases, database 22 may retrieve any information about the user maintained in database 22. In this particular embodiment, repository 22 identifies that client 18*b* is adapted to provide processing services for application 28 that will execute remote from client 18*b*. After receiving application 28 from database 22, repository 20 communicates application 28 and any user information to application server 24*a* for execution.

Application server 24*a* executes application 28 and initiates its communication session with client 18*b*. While the application server 24*a* executes application 28, client 18*b* is capable of locally executing commands related to application 28 and delivered via the data connection. By executing these commands, client 18*b* enables information to be communicated to the user, to be retrieved from the user, to be presented to the user, and to perform any other desired communicating and/or computing functionality with the user. In some cases, the locally executed commands enable client 18*b* to retrieve information from database 26. That is, the locally executed commands received from application server 24*a* direct client 18*b* to access database 26*b* and retrieve the desired information. In other cases, the locally executed commands enable client 18*b* to communicate any information provided by the user of client 18*b* to database 26 for storage.

To check a bank account balance, application 28 executing on application server 24*a* may send a first executable to client 18*b* for execution. This first executable may contain information relating to a portion of Voice XML code that requests the user to enter or speak an account number. Client 18*b* executes the executable by prompting the user to enter an account number. In some cases, client 18*b* can execute voice recognition software, text-to-speech software, and/or any other desired software that would assist with the collection of information from and/or the presentation of information to the user of client 18*b*. In this particular embodiment, the user of 18*b* enters the account number using a keypad. Although the user enters the account number using a keypad in this example, any other method may be used to enter the desired information without departing from the scope of the present disclosure. After the user enters the account number, client 18*b* communicates the information to application server 24*a* over the data communication link.

Upon receipt of the account number, application server 24*a* continues the execution of application 28. In this example, application 28 directs application server 24*a* to retrieve the account balance for the account number provided by the user of client 18*b* from database 22. In other embodiments, the account balance information may be received by application server 24*a* with receipt of application 28. In some cases, application server 24*a* may compare the account number received from the user of client 18*b* with the account number retrieved from database 22 for fraud protection purposes.

Once application server 24*a* has the account balance information, application server 24*a* can communicate an executable that contains the account balance information to client 18*b* for local execution. In some cases, the account balance could be sent as a data message for the user to view on a display associated with client 18*b* or the application server 24*a* could package a voice representation of the account balance as an executable, and transmit the executable to client 18*b*. In that case, client 18*b* would execute the executable, converting the data to voice, and the user hears his account balance from client 18*b*.

In the above embodiment, application server 24 retrieves information directly from database 22. In an alternative embodiment, application server 24 can send an executable to client 18*b* instructing client 18*b* to retrieve the desired information from database 22 and/or database 26, either directly or through a network connection. The executable can also instruct device 18 to send information to database 22 and/or 26. In various embodiments, database 22 and/or 26 can comprise user-specific information. For example, database 26 may include account information, credit information, medical information, and/or any other information of the user of client 18*b* In other embodiment, database 22 and/or 26 can comprise generally available information. For example, database 26 can include airline flight information, stock quotes, weather information, sports ticket information, movie information, and/or any other desired information.

In some cases, the information retrieved by client 18*b* can be processed by client 18*b* using an executable received from application server 24*a*. In other cases, the information retrieved by client 18*b* can be processed by one or more software modules that assist with the collection of information from and/or the presentation of information to the user of client 18*b*. In other embodiments, the data sought by client 18*b* can be communicated to client 18*b* through application server 24*a*.

As an example, a user may want to check on the status of an airline flight. Client 18*d* connects to application server 24*b*, which requests the appropriate application 28 from repository 20. Application 28 is executed on application server 24*b*. Application 28 sends an executable from application server 24*b* to client 18*d* that instructs client 18*d* to retrieve the flight information from database 26, which in this example contains flight status information. Client 18*d* initiates a connection to database 26 through network 12 to retrieve the information. The information can be sent back through network 12 to client 18*d*. In this example, the executable then instructs client 18*d* to present the flight status information to the user using one of a variety of methods, such as by text or voice. The user can then end the connection, or continue with other business.

In another embodiment, the executable could instruct client 18*d* to retrieve the information from database 26, but instead of processing the information at client 18*d* for presentation to the user, the information could be sent through network 12 to application server 24*b* for further processing. Application server 24*b*, for example, may convert the data concerning the flight status into an easily-readable text format, and then transmit that information to client 18*d* for presentation to the user.

Figure 1C:
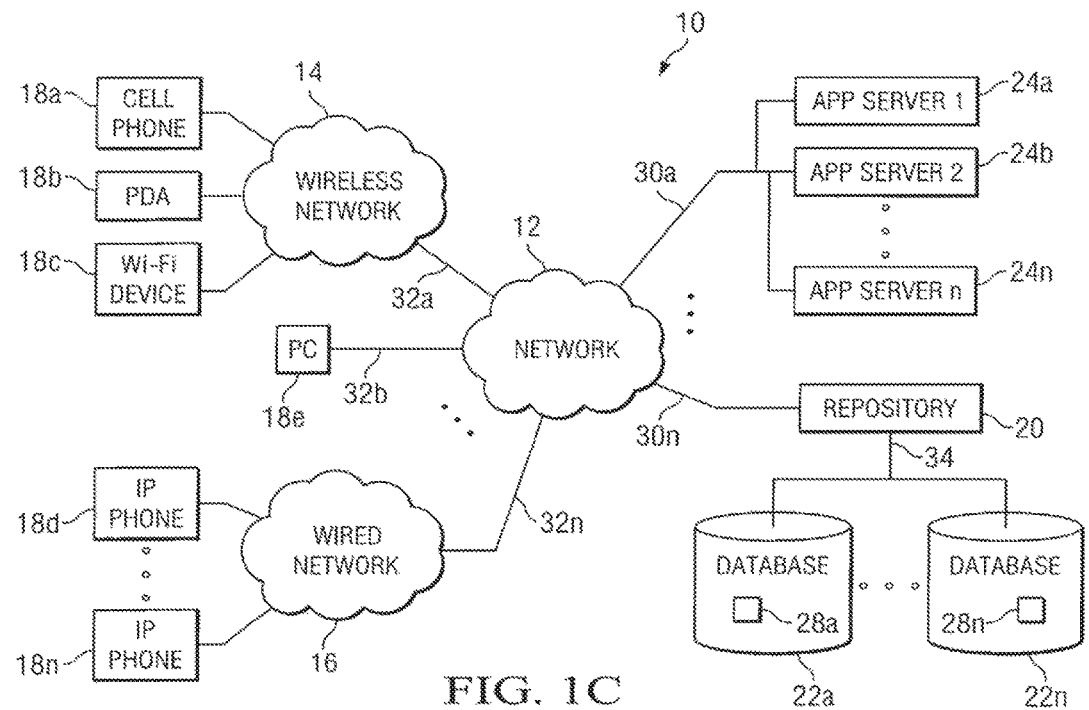

FIG. 1C is a block diagram of one example embodiment of communication system 10 that enables a client 18 to have one or more applications 28 executed remotely. FIG. 1C is similar to FIG. 1B; however, in this particular embodiment, system 10 includes a plurality of databases 22*a*-22*n* coupled to repository 20. Although a plurality of databases 22 are coupled to repository 20 in this example, system 10 could comprise a plurality of repositories 20 each including one or more databases 22 without departing from the scope of the present disclosure.

Figure 1D:
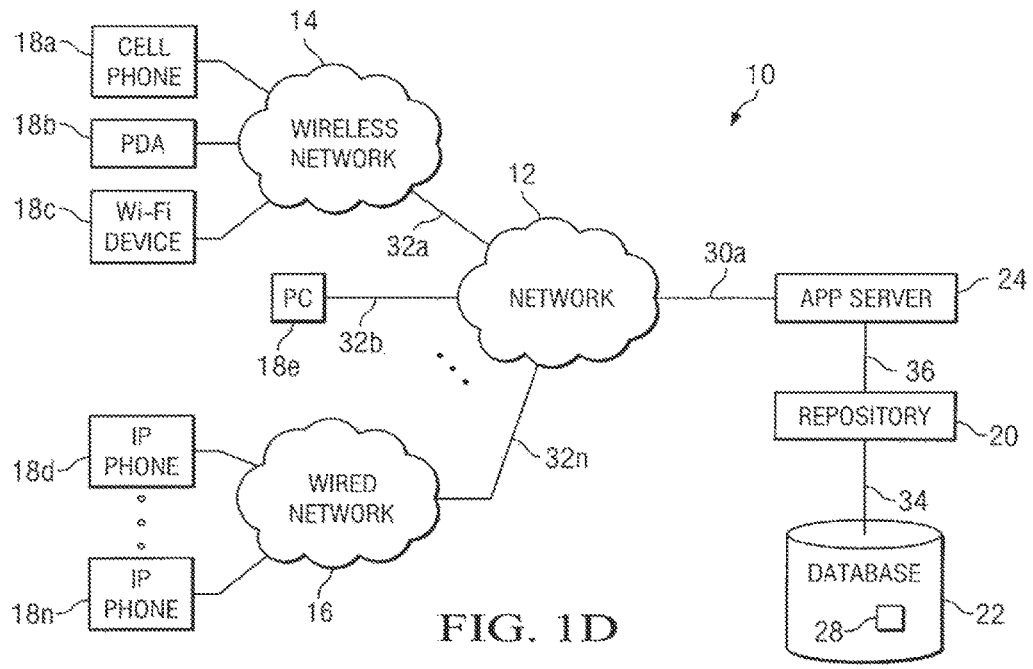

FIG. 1D is a block diagram of one example embodiment of communication system 10 that enables a client 18 to have an application 28 executed remotely. FIG. 1D is similar to FIG. 1A; however, in this particular embodiment, system 10 includes a direct communication link 36 between repository 20 and application server 24. Although one cluster that includes application server 24, repository 20, and database 22 is coupled to network 12 in this example, system 10 could comprise a plurality of clusters coupled to network 12 without departing from the scope of the present disclosure.

Figure 2:
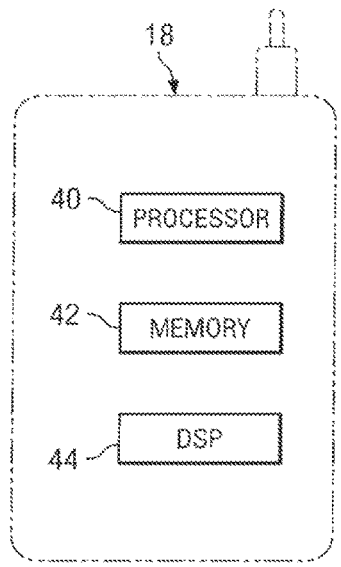
FIG. 2 illustrates one example of a client for use with a communication system that enables a client to have one or more applications executed remotely.

FIG. 2 illustrates one example embodiment of a client 18. In this particular embodiment, client 18 comprises a mobile telephone. Although client 18 comprises a mobile phone in this example, client 18 could comprise any other desired computing and/or communication device without departing from the scope of the present disclosure. For example, client 18 could comprise a voice over IP device, a desktop computer, a laptop computer, a personal digital assistant, a cell-phone, a Wi-Fi device, a workstation, a mainframe computer, a mini-frame computer, a web server, or any other computing and/or communicating device. In this particular embodiment, client 18 comprises a thin-client device that provides processing services to application 28 executing remotely from client 18.

In this example, client 18 comprises a processor 40, memory 42, and digital signal processor (DSP) 44. Client 18 also includes at least a display, input device, and speaker. Many communication devices already have processors and memory operable to interact with a communication system. Devices that use application server 24 to execute one or more executables associated with one or more applications 28, as described above, require less processing power and memory than a device that executes substantially all of applications 28.

Memory 42 provides storage for data, information, and/or programs to assist in communicating information to and/or receive information from application server 24 and/or the repository 20. The memory in the example embodiments is sufficient to handle the tasks that application servers 24 and/or repository 20 request of the device. Processing power also is sufficient to handle these, as well as the other tasks the device performs outside the context of the data collection system (such as making phone calls, sending and receiving text messages, other computing functions, etc.).

Figure 3:
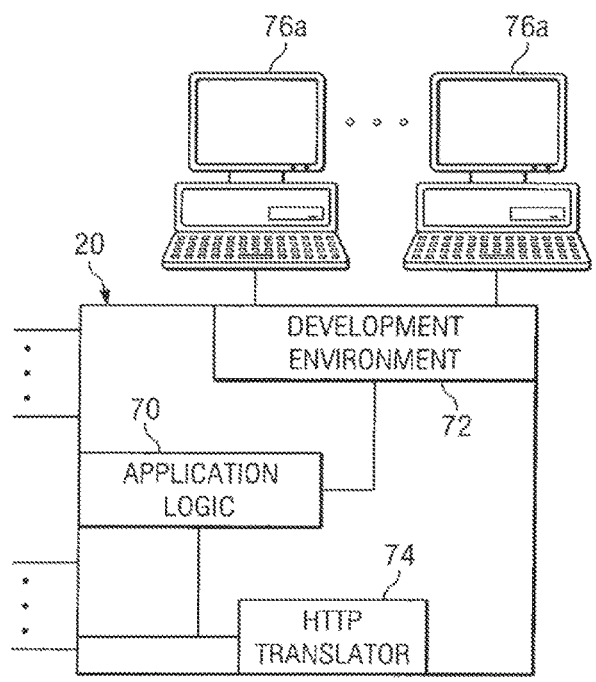
FIG. 3 illustrates one example embodiment of a repository for use in a communication system that that enables a client to have one or more applications executed remotely.

FIG. 3 shows one example of a repository for use in a communication system that enables a client to have one or more applications executed remotely. In this particular embodiment, repository 20 functions to communicate one or more applications and/or discrete programs to external devices, like application servers 24 and/or clients 18 of FIG. 1, for processing or execution.

In this example, repository 20 includes application logic 70 that is capable of performing a desired communicating and/or computing functionality, such as, for example, identifying a desired application and communicating the application, or portions thereof, to one or more of application servers for execution. In particular embodiments, application logic 70 may include one or more software and/or firmware modules, such as, for example, one or more software engines and/or one or more memory modules. Although application logic 70 is shown as being contained within repository 20 in this example, application logic could reside external to repository 20 without departing from the scope of the present disclosure.

In one particular example, application logic has access to one or more applications stored in a memory coupled to application logic 70. IN some cases, the memory can be substantially similar to the structure and function of database 22 of FIG. 1. In some cases, the one or more applications may include, for example, a Voice XML-based application, an HTML-based application, an XML-based application, an XIVR-based application, or a combination of these or other application formats.

In this particular example, repository 20 communicates an executable copy of a desired application to one or more application servers 24 for execution and establishment of a communication session with client 18. In various embodiments, the applications can be developed with development environment 72 through computer workstations 76a-76n. The applications can be programmed in proprietary languages requiring resident interpreters or compilers, or can use an extensible language, which can be transferable to a host processor (such as application servers 24) with the components used to run the given application. Languages such as hypertext markup language (HTML), extensible markup language (XML), Voice XML, and the like may be utilized in providing the extensibility to program applications for use with the present system.

Repository 20 may also facilitate browsing the Internet from a compatible client 18. In order to accomplish this, repository 20 includes an HTTP translator 74. Repository 20 can browse through the Internet, read the HTML web pages, and convert the HTML into a compatible format for communication to a user of client 18. Repository 20 can also direct application server 24 to perform these actions instead. The HTTP can then be converted into the appropriate transport protocol and the web pages, or portions thereof, can be sent to the client 18 by application server 24. In certain embodiments, the translation executed by HTTP translator 74 can convert text-to-speech and note hyperlinks as special cues to inform users of the executable links available. Additionally or alternatively, portions of the web site may be visually presented as text or graphics on a display associated with client 18. These conversion components can be included in the application processed by application server 24, or, if small enough, can be sent to client 18 and executed there.

Figure 4:
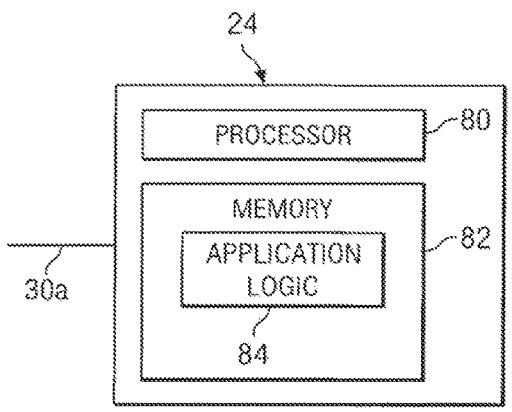
FIG. 4 illustrates one example embodiment of an application server for use in a communication system that that enables a client to have one or more applications executed remotely.

FIG. 4 shows one example of an application server for use in a communication system that that enables a client to have one or more applications executed remotely. In this example, application server 24 is capable of performing a desired communicating and/or computing functionality, such as, for example, accessing, retrieving, and/or executing one or more system applications, or portions thereof. As non-limiting examples, application server 24 could comprise some or all of a Voice XML-based system, an extensible interactive voice response (XIVR) system, an interactive web-based system, or a combination of these or other information systems. In particular embodiments, application server 24 may include one or more software and/or firmware modules. In various embodiments, application server 24 could comprise, for example, one or more software engines, one or more memory modules, and/or one or more speech recognition modules capable of processing Voice XML-based applications, XIVR-based applications, voice responses, text-to-speech translations, and/or speech-to-text translations.

In this particular embodiment, application server 24 includes a processor 80 and memory 82. Although application server 24 includes processor 80 and memory 82 in this example, any other desired computing and/or communication components may be included without departing from the scope of the present disclosure. In this example, processor 80 is capable of processing one or more requests received from a client and executing one or more applications. Processor 80 can comprise any computer processor, such a, for example, single-core, duel-core, and/or any other server processor that is capable of processing requests and executing applications.

In this example, memory 82 provides storage for data, information, and/or other programs to assist in the operation of application server 24. Memory 82 may include any hardware, software, firmware, or combination thereof operable to store and facilitate retrieval of one or more applications and/or information. Memory 82 may, for example, include a dynamic random access memory (DRAM), a static random access memory (SRAM), a NAND flash memory, or any other suitable volatile or nonvolatile storage and retrieval device or combination of devices. Although this example depicts memory 82 as a single medium, memory 82 may comprise any additional number of storage media without departing from the scope of the present disclosure. Additionally, all or part of memory 82 could reside at a location remote from and accessible to application server 24.

In this particular embodiment, memory 82 includes application logic 84 that is capable of processing a request received from a client and to determine the location of the application necessary to establish the requested communication session with the user of the client. Application logic 84 may comprise, for example, software, firmware, code, portions of code, a program, a web-page, information compilations, and/or a combination of these or any other types of utilities.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A communication system comprising:
an application server coupled to a first communication link and coupled to a second communication link, the first communication link and the second communication link each comprising a data connection, the application server adapted to establish a communication session with at least one communication device coupled to the first communication link in response to a request from the at least one communication device to establish the communication session, wherein the application server comprises a voice processing software program and the request from the at least one communication device comprises packetized voice data;
a repository having access to an application comprising at least a portion of computer code;
wherein the application server is either (a) configured to receive the application via the second communication link, or (b) configured to cause an execution of the application via the second communication link;
wherein the application server is configured to execute or cause the execution of the application remote from the at least one communication device;
wherein the voice processing software program is configured to generate a voice representation of information derived from the application;
wherein the application server is configured to transmit the voice representation and a request for processing service over the first communication link to the at least one communication device; and
wherein the request for processing service comprises an instruction to present a user of the at least one communication device the voice representation.

2. The communication system of claim 1, wherein the voice processing software program comprises at least one selected from the group of a voice recognition application, a speech-to-text application, a text-to-speech application, and a voice XML-based application; and
wherein the voice representation comprises an executable.

3. The communication system of claim 1, wherein the repository comprises a database, and the application is stored in the database.

4. The communication system of claim 1, wherein the repository comprises a server; and wherein the application is executed by the repository.

5. The communication system of claim 1, wherein the repository comprises a plurality of servers.

6. The communication system of claim 1, wherein the communication session comprises an exchange of the packetized voice data from the at least one communication device and packetized voice data or audio data from the application server.

7. The communication system of claim 1, wherein the application server comprises a plurality of servers.

8. The communication system of claim 7, wherein the voice processing software program is distributed across the plurality of servers.

9. The communication system of claim 1, wherein the voice processing software program comprises a voice recognition application, a speech-to-text application, and a text-to-speech application.

10. The communication system of claim 9, wherein the at least one communication device comprises a second voice recognition application configured to recognize at least one word spoken by a user of the at least one communication device.

11. The communication system of claim 1, wherein the application server is coupled to a plurality of servers via the second communication link.

12. The communication system of claim 11, wherein at least one of the plurality of servers is configured to execute the application in response to the receipt of a command related to the application sent by the application server via the second communication link.

13. The communication system of claim 12, wherein at least one of the plurality of servers comprises the repository.

14. A communication system, comprising:
a plurality of application servers;
a first communication link coupled to the plurality of application servers, the first communication link comprising a data connection;
a first one of the plurality of application servers configured to execute a first application to establish a communication session with at least one communication device coupled to the first communication link in response to a request from the at least one communication device to establish the communication session;
a second one of the plurality of application servers coupled to a second communication link, the second one of the plurality of servers either (a) configured to receive a second application from at least one repository having a database maintaining the second application over the second communication link, or (b) configured to cause an execution of the second application via the second communication link;
wherein the second communication link comprises a data connection;

wherein the second one of the plurality of application servers is configured to execute or cause the execution of the second application remote from the at least one communication device;

wherein at least one of the plurality of application servers is configured to communicate a request for processing service to the at least one communication device; and wherein the request for processing service is communicated to the at least one communication device over the first communication link.

15. The communication system of claim 14, wherein the first one of the plurality of application servers comprises a voice processing software program and the request from the at least one communication device comprises packetized voice data.

16. The communication system of claim 14, wherein the at least one repository comprises a server.

17. The communication system of claim 14, wherein the second communication link comprises a plurality of data socket connections.

18. The communication system of claim 14, wherein the request for processing service comprises an instruction to present a user of the at least one communication device voice data or audio data.

19. The communication system of claim 18, wherein the at least one communication device comprises a voice recognition application configured to recognize at least one word spoken by a user of the at least one communication device.

20. An interactive, voice-based communication system, comprising:
at least one application server coupled to a first communication link and coupled to a second communication link, the first communication link and the second communication link each comprising a data connection, the at least one application server operable to establish a communication session in response to a request from at least one communication device;
at least one repository coupled to the second communication link, the at least one repository either (a) configured to transmit at least one portion of an application to the at least one application server, or (b) configured to execute the at least one portion of the application;
wherein the communication session comprises an exchange of packetized voice data from the at least one communication device and packetized voice data or audio data from the at least one application server;
wherein the at least one application server comprises a first voice recognition application, a speech-to-text application, and a text-to-speech application;
wherein the first communication link comprises the Internet; and
wherein the at least one portion of the application is maintained in the at least one repository or a database coupled to the at least one repository.

21. The communication system of claim 20, wherein the at least one application server is configured to receive, over the first communication link, information originating from the at least one communication device regarding a stylus input or a touch input.

22. The communication system of claim 20, wherein the at least one repository coupled to the second communication link is either (i) configured to send at least an additional portion of the application or a second application to the at least one application server over the second communication link or (ii) configured to execute at least the additional portion of the application or the second application in response to a request from the at least one application server.

23. The communication system of claim 20, wherein the at least one repository is a server.

24. The communication system of claim 20, wherein the first communication link and/or the second communication link further comprise at least one data socket connection.

25. The communication system of claim 20, wherein the at least one communication device comprises a second voice recognition application configured to recognize at least one word spoken by a user of the at least one communication device.

26. The communication system of claim 25, wherein the communication session further comprises at least one instruction transmitted by the at least one server to the at least one communication device, the instruction comprising a request for processing service.

27. The communication system of claim 20, wherein the text-to-speech application is configured to generate a voice representation of information derived from the application.

28. The communication of claim 27, wherein the at least one application server is configured to transmit a request for processing service over the first communication link to the at least one communication device, and wherein the request for processing service comprises an instruction to present a user of the at least one communication device the voice representation.

29. A method of providing responses in an interactive, voice-based communication system, comprising:
receiving, by at least one application server over a first communication link, a request from at least one communication device, wherein the request comprises packetized voice data;
translating, by the at least one application server, the packetized voice data to a text representation using a first application;
identifying, by the at least one application server or at least one repository coupled to the at least one application server, a second application to be executed in response to the request using the text representation;
executing at least one portion of the second application;
transmitting, by the at least one application server, packetized voice or audio data to the at least one communication device, the packetized voice or audio data responsive to the request;
wherein the first communication link comprises a data connection;
wherein the first communication link further comprises the Internet; and
wherein the at least one portion of the second application is maintained in the at least one repository or a database coupled to the at least one repository.

30. The method of claim 29, further comprising communicating by the at least one repository the at least one portion of the second application to the at least one application server over a second communication link if at least one portion of the second application is not stored on the at least one application server at a time the request is received;
wherein the at least one portion of the second application is executed by the at least one application server.

* * * * *

(12) INTER PARTES REVIEW CERTIFICATE (3163rd)
United States Patent
Hammond

(10) Number: US 10,270,816 K1
(45) Certificate Issued: Jun. 29, 2023

(54) METHOD AND SYSTEM FOR ENABLING A COMMUNICATION DEVICE TO REMOTELY EXECUTE AN APPLICATION

(71) Applicant: Daniel D. Hammond

(72) Inventor: Daniel D. Hammond

(73) Assignee: HAMMOND DEVELOPMENT INTERNATIONAL, INC.

Trial Number:
IPR2020-00081 filed Nov. 26, 2019

Inter Partes Review Certificate for:
Patent No.: 10,270,816
Issued: Apr. 23, 2019
Appl. No.: 16/193,532
Filed: Nov. 16, 2018

The results of IPR2020-00081 are reflected in this inter partes review certificate under 35 U.S.C. 318(b).

INTER PARTES REVIEW CERTIFICATE
U.S. Patent 10,270,816 K1
Trial No. IPR2020-00081
Certificate Issued Jun. 29, 2023

AS A RESULT OF THE INTER PARTES REVIEW PROCEEDING, IT HAS BEEN DETERMINED THAT:

Claims 15-17 and 19 are found patentable.

Claims 1-14, 18 and 20-30 are cancelled.

\* \* \* \* \*